M. C. FRENCH.
PLOW COLTER.
APPLICATION FILED NOV. 20, 1915.
1,191,685.
Patented July 18, 1916.
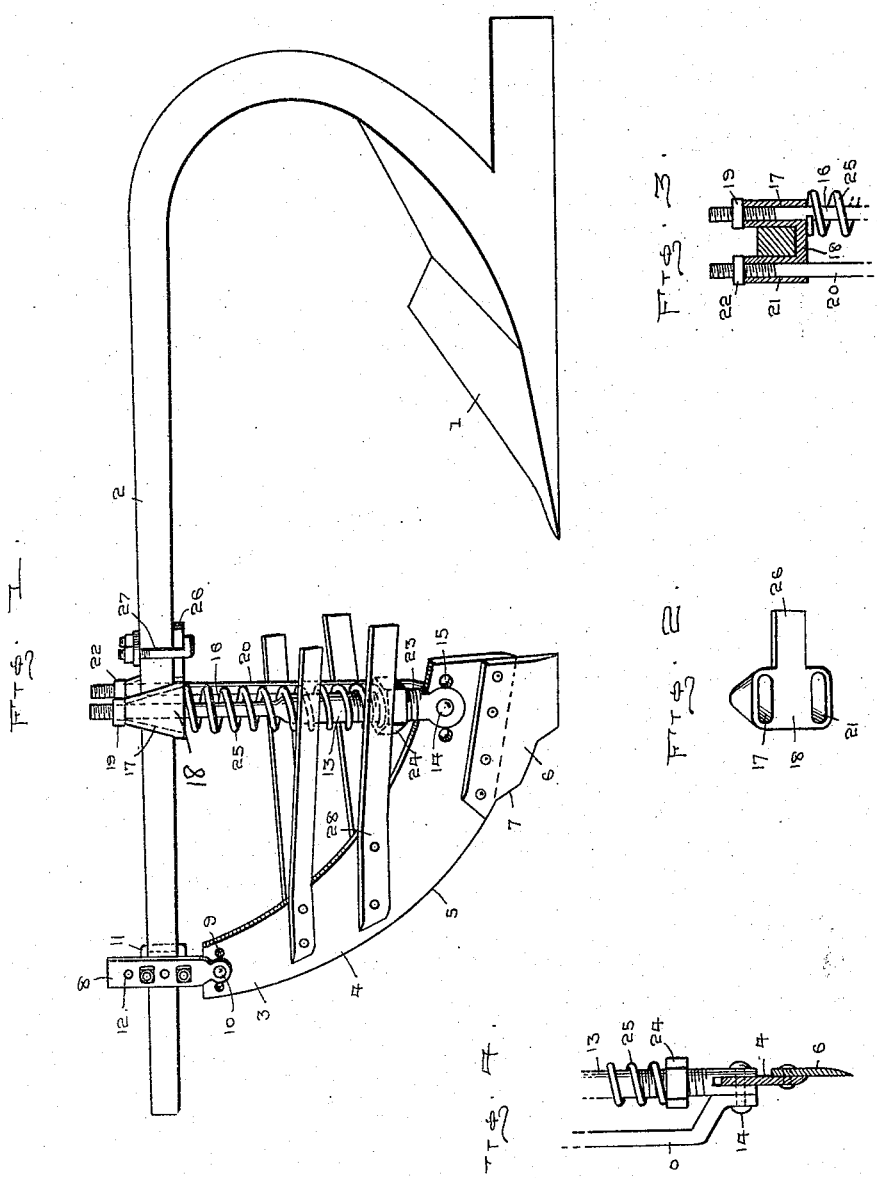
Witnesses
Inventor
M. C. French
By W. J. FitzGerald
Attorney

UNITED STATES PATENT OFFICE.

MORGAN C. FRENCH, OF CRAIG, COLORADO.

PLOW-COLTER.

1,191,685.  Specification of Letters Patent.  Patented July 18, 1916.

Application filed November 20, 1915. Serial No. 62,527.

*To all whom it may concern:*

Be it known that I, MORGAN C. FRENCH, a citizen of the United States, residing at Craig, in the county of Moffat and State of Colorado, have invented certain new and useful Improvements in Plow-Colters; and I do hereby declare the following to be a full, clear, and exact description of the invention, such as will enable others skilled in the art to which it appertains to make and use the same.

My invention relates to new and useful improvements in plow colter and my object is to provide a device of this class which may be attached to any make of plow or plow beam.

A further object is to provide means for yieldingly attaching the colter to the plow beam.

A further object is to provide adjusting means for the colter.

A further object is to provide a removable cutting edge for the colter. And a further object is to provide guards on the colter for separating weeds, brush, and the like, to form a path for the plow standard or beam.

Other objects and advantages will be hereinafter set forth and more particularly pointed out in the accompanying specification.

In the accompanying drawings which are made a part of this application, Figure 1 is a perspective view of a plow, showing my improved colter attached to the beam thereof. Fig. 2 is a bottom perspective view of a supporting guide for parts of the colter. Fig. 3 is a detail sectional view through the plow beam, showing means of attaching the rear end of the colter thereto, and Fig. 4 is a detail sectional view through the rear portion of the colter showing the supporting means therefor.

Referring to the drawings in which similar reference numerals designate corresponding parts throughout the several views, 1 indicates a plow to which is attached a beam 2, said plow and beam being of any preferred construction and for any desired use.

Positioned forwardly of the plow proper is my improved form of colter 3 which consists of a flat curved plate 4, the forward edge 5 of which is beveled to form a cutting edge, the lower rear end portion of the colter having a blade 6 removably secured thereto, the forward edge of the blade being stepped to form substantially vertical cutting faces 7 so that roots, etc., encountered within the soil will be more readily severed in two.

The upper or forward end of the colter is attached to the beam 2 by pivotally securing a bar 8 to said upper end, a plate 4 having a plurality of openings 9 for the reception of the bolt 10 so that said bar may be adjusted forwardly or rearwardly on said plate. The bar 8 is attached to the beam by introducing a clip 11 around the beam and extending the same through openings 12 in the bar 8 and by providing a number of said openings, the bar and colter attached thereto may be adjusted vertically.

The opposite end of the plate 4 has pivotally attached thereto a standard 13, the lower end of the standard being preferably bifurcated to receive the blade and said blade is pivotally and adjustably attached to the standard by introducing a bolt 14 transversely through the lower end of the standard and through any one of a plurality of openings 15 in the plate 4.

The upper end of the standard 13 is reduced in diameter to form a shank 16 which projects through an opening 17 of a supporting guide member 18, the opening 17 being oblong at its lower end and terminating in a circular opening at its upper end so that the shank 16 may have swinging movement therein. The extreme upper end of the shank 16 is threaded to receive a nut 19 by means of which the standard 13 may be given vertical adjustment and limited in its downward movement by the nut coming into engagement with the upper end of the guide member.

The standard 13 and colter 3 are braced against undue lateral strain by providing a brace rod 20, the lower end of which is secured by the bolt 14 while the upper end thereof is extended through an opening 21 in the guide member 18 which opening is similar to the opening 17, the extreme upper end of the brace rod being threaded to receive a nut 22 for adjusting the rod in the same manner that the standard 15 is adjusted.

The lower portion of the standard 13 is provided with threads 23 to receive a nut 24, said nut being employed for regulating the tension of a coil spring 25 positioned between the nut and the guide member 18 and surrounding said standard and its shank.

The parts of the guide member having the openings 17 and 21 therethrough are substantially conical in general outline and spaced apart so as to throw the shank and brace rod on opposite sides of the plow beam and said guide member is provided with a rearwardly extending tongue 26 which fits against the lower face of the beam and is attached thereto by means of a clip 27, or in any other suitable manner.

In order to prevent grass, brush, or other obstructions from catching upon the standard 13 and brace rod 20 and also to form a path for the plow standard as it travels forwardly, the colter 3 has attached thereto guard fingers 28 which are preferably arranged in pairs and attached at one end to the plate 4, while the opposite ends thereof are flared outwardly from each other and disposed on opposite sides and beyond the standard 13 and brace rod 20.

This device is applicable for use in connection with any form of plow and can be readily attached to the beam thereof, and by mounting the colter in the manner shown it may have upward swinging movement for passing over rocks or other similar obstructions without disturbing the action of the plow. It will likewise be seen that by providing the spring 25 and properly regulating the tension thereof, the colter 3 will be held in its proper position under all ordinary circumstances and will immediately lower the colter into engagement with the soil as soon as the cutting edge has passed over a solid object. It will likewise be seen that by providing the movable cutting blades they may be removed for sharpening or new ones substituted therefor.

Having thus fully described my invention what I claim as new and desire to secure by Letters Patent of the United States, is:—

1. The combination with a plow beam, of a colter comprising a curved plate, a blade removably secured to the plate having stepped portions to form cutting faces, and means to adjustably attach the plate to the plow beam.

2. The combination with a plow beam, of a colter comprising a plate, a blade having cutting faces removably secured to said plate, a bar adjustably and pivotally secured to the forward end of said plate, means to adjustably secure the bar to the beam, a standard adjustably and pivotally secured to the opposite end of said plate, a guide member for the upper end of the standard, a spring surrounding the standard, an adjusting nut on the standard to regulate the tension of said spring, a brace rod attached to said standard and extending upwardly, said standard and rod being on opposite sides of the beam, and means to attach the guide member to the plow beam.

3. The combination with a plow beam, of a colter comprising a curved plate having a forward cutting edge, a blade removably secured to said plate and having cutting faces, means to adjustably and pivotally attach the forward end of the plate to the beam, a guide member having openings therethrough, means to attach the guide member to the beam, a standard adjustably secured to said plate and having its upper end extending through one of said openings in the guide member, a brace rod attached at its lower end to the standard and having its upper end introduced through the other opening of the guide member, said standard and brace rod being on opposite sides of the beam, a coil spring surrounding said standard, and means to adjust the tension of said spring.

4. The combination with a colter comprising a plate and a standard, of guards comprising outwardly curved fingers arranged in pairs on said plate, the separated ends thereof projecting on opposite sides of the standard.

In testimony whereof I have signed my name to this specification in the presence of two subscribing witnesses.

MORGAN C. FRENCH.

Witnesses:
ANDREW J. DAVIDSON,
E. H. CARR.

Copies of this patent may be obtained for five cents each, by addressing the "Commissioner of Patents, Washington, D. C."